United States Patent
Polasa et al.

(10) Patent No.: US 12,041,048 B2
(45) Date of Patent: Jul. 16, 2024

(54) SYSTEM AND METHOD FOR AUTHENTICATING INTERACTIONS WITH DYNAMICALLY VARYING DIGITAL RESOURCES LINKED TO RESOURCE DISTRIBUTION DEVICES

(71) Applicant: BANK OF AMERICA CORPORATION, Charlotte, NC (US)

(72) Inventors: Puneetha Polasa, Telangana (IN); Sandeep Kumar Chauhan, Hyderabad (IN); Bhagya Lakshmi Sudha Lavanya Mallidi, Hyderabad (IN); Udaya Kumar Raju Ratnakaram, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 229 days.

(21) Appl. No.: 17/716,662

(22) Filed: Apr. 8, 2022

(65) Prior Publication Data
US 2023/0328058 A1    Oct. 12, 2023

(51) Int. Cl.
*H04L 9/40*      (2022.01)

(52) U.S. Cl.
CPC ........ *H04L 63/0861* (2013.01); *H04L 63/102* (2013.01); *H04L 63/126* (2013.01)

(58) Field of Classification Search
CPC .. H04L 63/0861; H04L 63/102; H04L 63/126
See application file for complete search history.

(56) References Cited

U.S. PATENT DOCUMENTS

| | | | |
|---|---|---|---|
| 4,317,957 A | 3/1982 | Sendrow | |
| 7,317,814 B2 | 1/2008 | Kostrzewski et al. | |
| 8,032,927 B2 | 10/2011 | Ross | |
| 8,577,091 B2 | 11/2013 | Ivanov et al. | |
| 8,942,438 B2 | 1/2015 | Ivanov et al. | |
| 9,224,196 B2 | 12/2015 | Duerksen et al. | |
| 9,436,863 B2 | 9/2016 | Setlak | |
| 9,743,279 B2 | 8/2017 | Rachuri et al. | |
| 10,698,989 B2 | 6/2020 | Giobbi | |
| 10,911,423 B2 | 2/2021 | Kim et al. | |
| 11,068,909 B1 | 7/2021 | Land et al. | |

(Continued)

*Primary Examiner* — Viet D Vu
(74) *Attorney, Agent, or Firm* — Moore & Van Allen PLLC; Nicholas C. Russell (57) ABSTRACT

Embodiments of the present invention provide a system for authenticating interactions with dynamically varying digital resources linked to resource distribution devices. In particular, the system may be configured to identify initiation of an interaction by a user, via a resource distribution device, receive a request to verify a digital resource from an entity device, wherein the digital resource is captured by the entity device from a display of the resource distribution device, verify that the digital resource matches a stored digital resource linked with the user and transmit a confirmation to the entity device, receive a completion request from an interaction server to complete the interaction, validate that the digital resource is registered to the user, determine that the validation is successful, perform multi-level authentication to authorize completion of the interaction, and complete the interaction in response to performing the multi-level authentication.

20 Claims, 8 Drawing Sheets

(56) References Cited

U.S. PATENT DOCUMENTS

| | | |
|---|---|---|
| 11,107,069 B2 | 8/2021 | Hammad et al. |
| 2002/0032661 A1 | 3/2002 | Schuba et al. |
| 2002/0091945 A1 | 7/2002 | Ross |
| 2002/0095389 A1 | 7/2002 | Gaines |
| 2002/0108062 A1 | 8/2002 | Nakajima et al. |
| 2002/0116626 A1 | 8/2002 | Wood |
| 2012/0042171 A1 | 2/2012 | White et al. |
| 2015/0071507 A1 | 3/2015 | Setlak |
| 2017/0272418 A1 | 9/2017 | Kim et al. |
| 2017/0289127 A1* | 10/2017 | Hendrick ............ H04W 12/065 |
| 2019/0394052 A1* | 12/2019 | Li ..................... H04L 9/3247 |
| 2022/0215217 A1* | 7/2022 | Hart .................. G06Q 20/3278 |
| 2023/0024880 A1* | 1/2023 | Wurmfeld ............ H04W 12/06 |

\* cited by examiner

SYSTEM AND METHOD FOR AUTHENTICATING INTERACTIONS WITH DYNAMICALLY VARYING DIGITAL RESOURCES LINKED TO RESOURCE DISTRIBUTION DEVICES

BACKGROUND

There exists a need for a system to authenticate interactions with dynamically varying digital resources linked to distribution devices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for authenticating interactions with dynamically varying digital resources linked to resource distribution devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of an interaction by a user, via a resource distribution device, receives a request to verify a digital resource from an entity device, wherein the digital resource is captured by the entity device from a display of the resource distribution device, verifies that the digital resource matches a stored digital resource linked with the user and transmit a confirmation to the entity device, receives a completion request from an interaction server to complete the interaction, validates that the digital resource is registered to the user, determines that the validation is successful, performs multi-level authentication to authorize completion of the interaction, and completes the interaction in response to performing the multi-level authentication.

In some embodiments, the present invention identifies initiation of the interaction based on receiving an indication from the resource distribution device.

In some embodiments, the present invention identifies initiation of the interaction based on receiving an indication from the entity device, wherein the interaction is initiated at the entity device by the user In some embodiments, the present invention receives one or more digital resources from the user, links the one or more digital resources with one or more resource distribution devices associated with the user, wherein the one or more resource distribution devices comprise the resource distribution device and the one or more or digital resources comprise the digital resource, determines value of the one or more digital resources, categorizes the one or more digital resources into one or more tiered digital resources based on the value of the digital resources, and assigns each of the one or more tiered digital resources to one or more levels of interactions performed using the one or more resource distribution devices.

In some embodiments, the present invention in response to identifying initiation of the interaction, identifies an interaction level associated with the interaction, selects a tiered digital resource associated with the interaction level, dynamically transmits the tiered digital resource to the resource distribution device to display the tiered digital resource on the resource distribution device, wherein the tiered digital resource is the digital resource.

In some embodiments, the present invention performs the multi-level authentication based on prompting the user to provide a fingerprint, via a fingerprint scanner located on the resource distribution device, receiving the fingerprint from the user, via the fingerprint scanner, verifying that the fingerprint received via the fingerprint scanner matches a stored fingerprint, and authorizing the interaction based on verifying that the fingerprint received via the fingerprint scanner matches the stored fingerprint.

In some embodiments, the stored fingerprint is stored in the entity system or a memory of the resource distribution device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity that allows users to perform one or more interactions associated with resource pools of the users. In some embodiments of the present invention, the entity device may be an automated machine. In some embodiments, the "automated machine" may be any automated device that is involved in distribution of resources such as cash, checks, electronic transfers, money orders or the like which may be performed using a credit card, a debit card, or the like. In one embodiment of the present invention, the automated machine may be an Automated Teller Machine (ATM). In some embodiments, the "automated machine" may be any automated device that provides information associated with resource pools of the user. In some embodiments, the automated machine may be owned and/or controlled by the resource entity. In some embodiments, an entity device may be a Point of Sale (POS) device. In some embodiments, an entity device may be an online server, where the online server may be a cloud based server. A "resource instrument" or a "resource distribution device" as used herein may be any instrument used by the users to perform interactions or resource distribution requests. Examples of resource instruments may include, but are not limited to, a credit card, a debit card, or the like.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "system environment", as used herein, may refer to any information technology platform of an enterprise (e.g., a national or multi-national corporation) and may include a multitude of servers, machines, mainframes, personal computers, network devices, front and back end systems, database system and/or the like.

"Distributed register," as used herein may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger.

In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

In accordance with embodiments of the invention, "digital resources" may be Non-Fungible Tokens (NFTs), where NFT is a unit of data used a unique digital identifier stored on a distributed register that certifies ownership and authenticity of a digital artifact. As such, NFTs are stored in a distributed ledger—a database that is consensually shared and synchronized across multiple sites, institutions, or geographies, accessible by multiple people. Distributed ledgers use independent computers (referred to as nodes) to record, share and synchronize transactions in their respective electronic ledgers (instead of keeping data centralized as in a traditional ledger). In accordance with embodiments of the present invention, NFTs are created when a distributed ledger (e.g., blockchain) string records of cryptographic hash, a set of characters that verifies a set of data to be unique, onto previous records therefore creating a chain of identifiable data artifacts. This cryptographic transaction process ensures the authentication of each digital file by providing a digital signature that is used to track NFT ownership.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
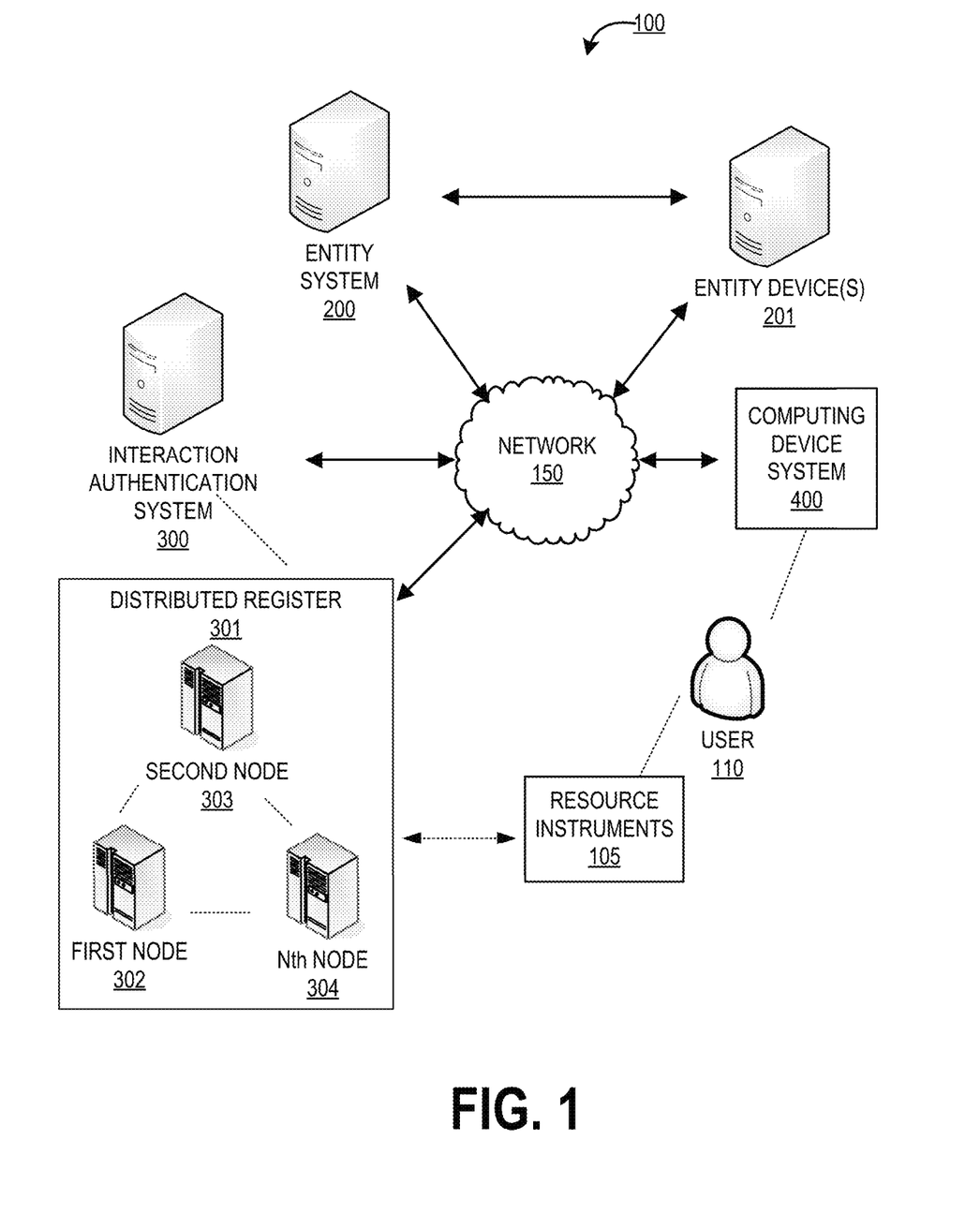
FIG. 1 provides a block diagram illustrating a system environment for authenticating interactions with dynamically varying digital resources linked to resource distribution devices, in accordance with an embodiment of the invention.

FIG. 1 provides a block diagram illustrating a system environment 100 for authenticating interactions with dynamically varying digital resources linked to resource distribution devices, in accordance with an embodiment of the invention. As illustrated in FIG. 1, the environment 100 includes an interaction authentication system 300, entity system 200, one or more entity devices 201, a distributed register 301, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200, where the entity maintains and/or manages one or more resource pools (e.g., checking account, savings account, or the like) associated with the users 110. In some embodiments, one or more resource instruments 105 associated with the one or more users 110 may be a part of the environment 100, where the resource instruments may be instrument used by the users to perform to initiate interactions or resource distribution requests. Examples of resource instruments may include, but are not limited to, a credit card, a debit card, or the like.

The entity system(s) 200 may be any system owned or otherwise controlled by an entity to support or perform one or more process steps described herein. In some embodiments, the entity is a financial institution. In some embodiments, the one or more entity devices 201 may be owned, operated, controlled, and/or maintained by the entity. Examples of the one or more entity devices may include, but are not limited to, Automated Teller Machines, Point of Sale devices, online servers, or the like that allows users 110 to perform one or more interactions associated with resource pools of the users 110.

The interaction authentication system 300 is a system of the present invention for performing one or more process steps described herein. In some embodiments, the interaction authentication system 300 may be an independent system. In some embodiments, the interaction authentication system 300 may be a part of the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the interaction authentication system 300, the entity system 200, the entity devices 201, and the computing device system 400 may be one or more nodes of the distributed register 301. In some embodiments, the resource instruments 105 of the users 110 may be nodes of the distributed register 301.

The interaction authentication system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the interaction authentication system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the interaction authentication system 300, and/or entity system 200 across the network 150. In some embodiments of the invention, the computing device system 400 may be a mobile device.

Figure 2:
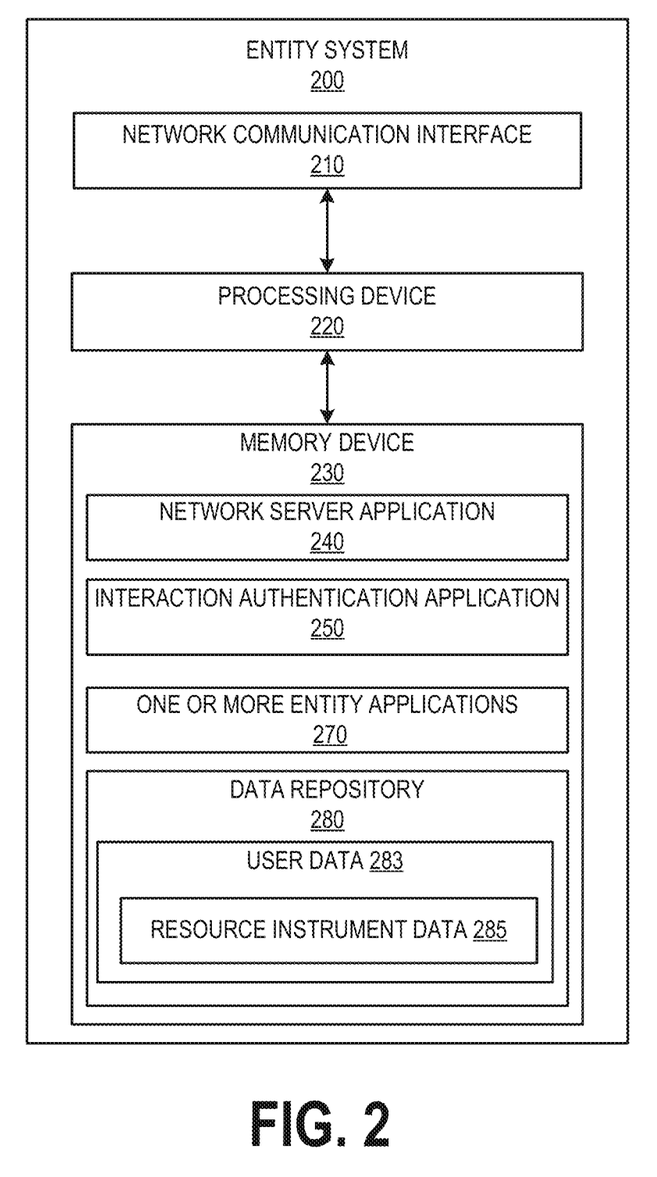
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an interaction authentication application 250, one or more entity applications 270, and a data repository 280 comprising user data 283, where the user data 283 comprises data associated with users 110 and/or one or more resource pools associated with the users 110. The user data 283 further comprise resource instrument data 285 associated with the users of the corresponding user data 283 The one or more entity applications 270 may be any applications provided by the entity that allows users 110 to access information and/or perform one or more actions associated with one or more resource pools of the users 110. The computer-executable program code of the network server application 240, the interaction authentication application 250, the one or more entity application 270 to perform certain logic, data-extraction, and data-storing functions of the entity system 200 described herein, as well as communication functions of the entity system 200.

The network server application 240, the interaction authentication application 250, and the one or more entity applications 270 are configured to store data in the data repository 280 or to use the data stored in the data repository 280 when communicating through the network communication interface 210 with the interaction authentication system 300, and/or the computing device system 400 to perform one or more process steps described herein. In some embodiments, the entity system 200 may receive instructions from the interaction authentication system 300 via the interaction authentication application 250 to perform certain operations. The interaction authentication application 250 may be provided by the interaction authentication system 300.

Figure 3:
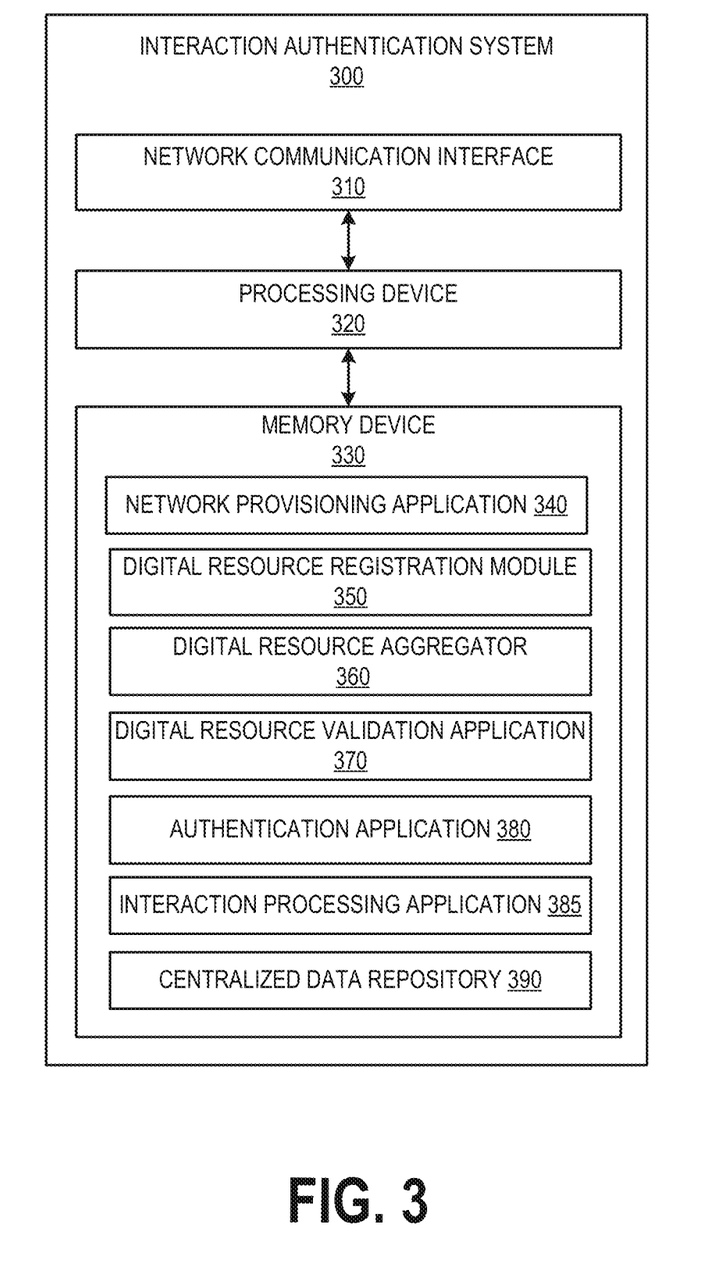
FIG. 3 provides a block diagram illustrating an interaction authentication system 300 of FIG. 1, in accordance with an embodiment of the invention.

FIG. 3 provides a block diagram illustrating the interaction authentication system 300 in greater detail, in accordance with embodiments of the invention. As illustrated in FIG. 3, in one embodiment of the invention, the interaction authentication system 300 includes one or more processing devices 320 operatively coupled to a network communication interface 310 and a memory device 330. In certain embodiments, the interaction authentication system 300 is operated by a first entity, such as a financial institution, while in other embodiments, the interaction authentication system 300 is operated by an entity other than a financial institution. In some embodiments, the interaction authentication system 300 is owned or operated by the entity of the entity system 200. In some embodiments, the interaction authentication system 300 may be an independent system. In alternate embodiments, the interaction authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the interaction authentication system 300 described herein. For example, in one embodiment of the interaction authentication system 300, the memory device 330 includes, but is not limited to, a network provisioning application 340, a digital resource registration module 350, a digital resource aggregator 360, a digital resource validation application 370, an authentication application 380, an interaction processing application 385, and a centralized data repository 390 comprising data processed or accessed by one or more applications in the memory device 330. The computer-executable program code of the network provisioning application 340, the digital resource registration module 350, the digital resource aggregator 360, the digital resource validation application 370, the authentication application 380, and the interaction processing application 385 may instruct the processing device 320 to perform certain logic, data-processing, and data-storing functions of the interaction authentication system 300 described herein, as well as communication functions of the interaction authentication system 300.

The network provisioning application 340, the digital resource registration module 350, the digital resource aggregator 360, the digital resource validation application 370, the authentication application 380, and the interaction processing application 385 are configured to invoke or use the data in the data repository 390 when communicating through the network communication interface 310 with the entity system 200, and/or the computing device system 400. In some embodiments, the network provisioning application 340, the digital resource registration module 350, the digital resource aggregator 360, the digital resource validation application 370, the authentication application 380, and the interaction processing application 385 may store the data extracted or received from the entity system 200, and the computing device system 400 in the centralized data repository 390. In some embodiments, the network provisioning application 340, the digital resource registration module 350, the digital resource aggregator 360, the digital resource validation application 370, the authentication application 380, and the interaction processing application 385 may be a part of a single application. The functionalities of the network provisioning application 340, the digital resource registration module 350, the digital resource aggregator 360, the digital resource validation application 370, the authentication application 380, and the interaction processing application 385 are explained in greater detail in FIGS. 5A, 5B, and 7.

Figure 4:
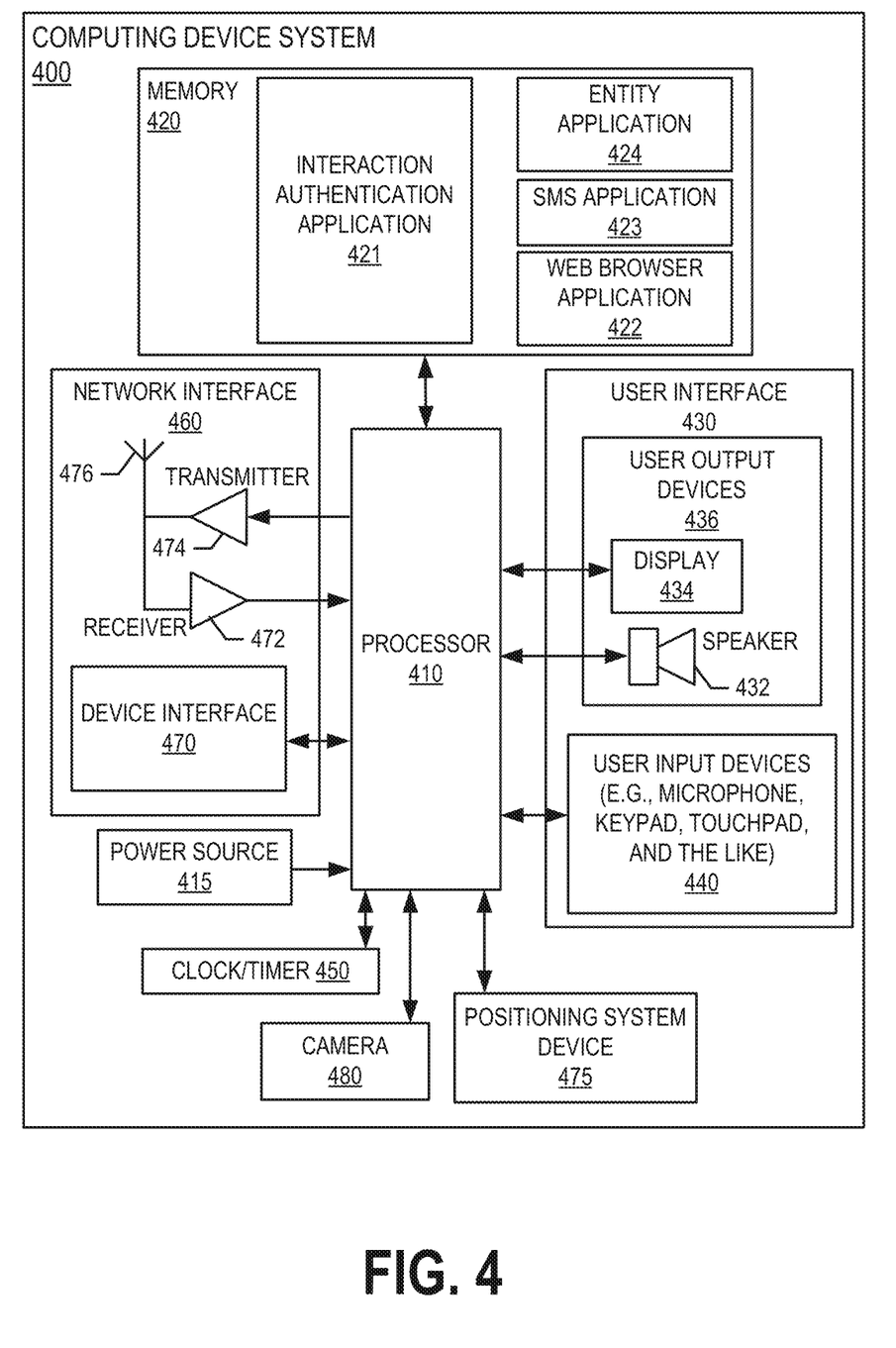
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an interaction authentication application 421, entity application 424, an SMS application 423, or the like. In some embodiments, the entity application 424 may be an online banking application. The interaction authentication application 421 may comprise instructions to a graphical user interface (GUI) on the display 430 that allows the user 110 to interact with the entity system 200, the interaction authentication system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the interaction authentication application 421 provided by the interaction authentication system 300 allows the user 110 to access the interaction authentication system 300. In some embodiments, the entity application 424 provided by the entity system 200 and the interaction authentication application 421 allow the user 110 to access the functionalities provided by the interaction authentication system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5A:
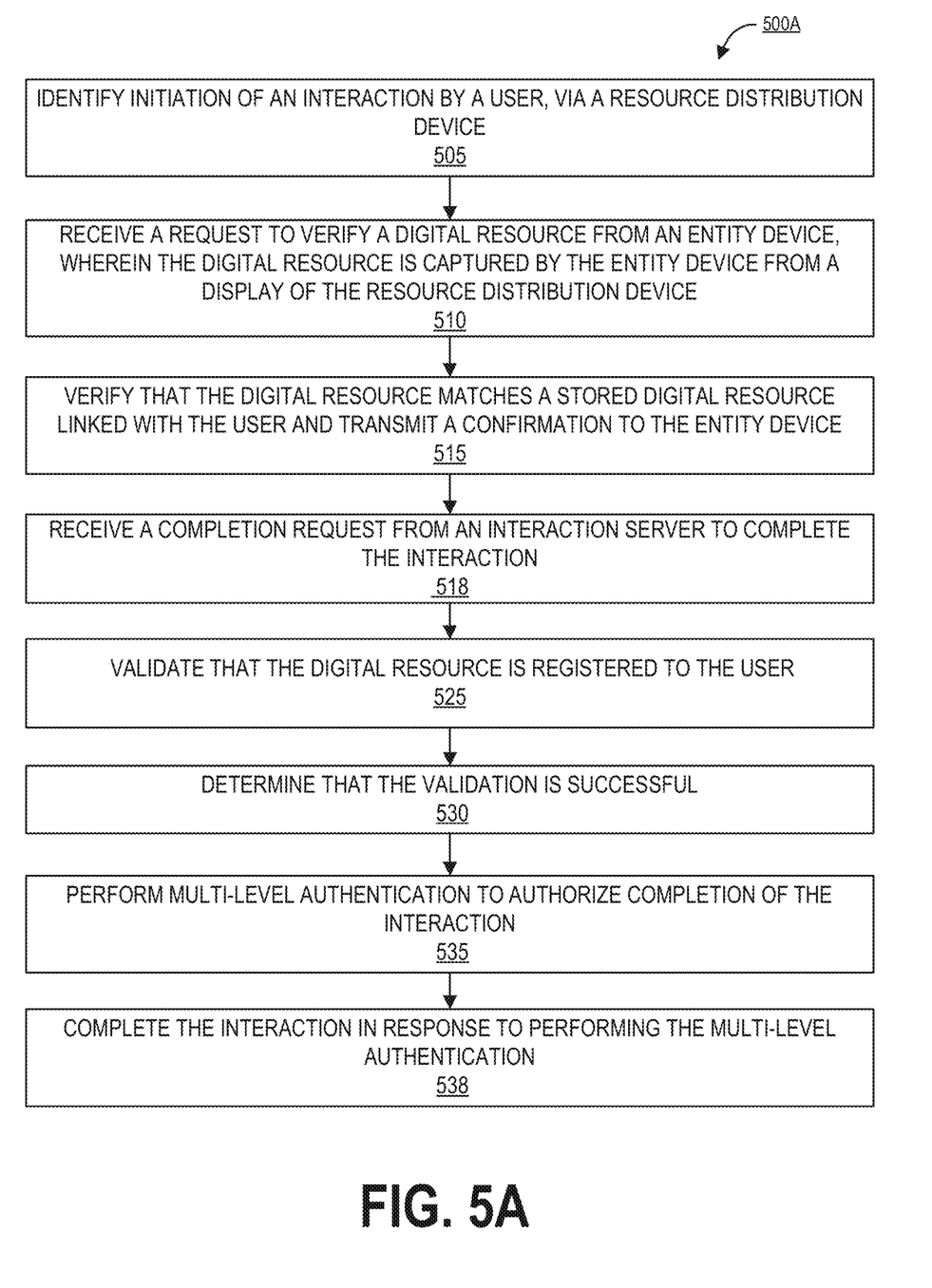
FIG. 5A provides a process flow for authenticating interactions with dynamically varying digital resources linked to resource distribution devices, in accordance with an embodiment of the invention.

FIG. 5A provides a block diagram illustrating a process flow 500A for authenticating interactions with dynamically varying digital resources linked to resource distribution devices, in accordance with an embodiment of the invention.

As shown in block 505, the system identifies initiation of an interaction by a user, via a resource distribution device. The resource distribution device may be any instrument used by a user of an entity to initiate interactions or resource distribution requests. Examples of resource instruments may include, but are not limited to, a credit card, a debit card, or the like. An exemplary resource distribution device used in this process flow is shown in FIG. 6. The resource distribution device described herein comprises one or more logical components for performing one or more steps of this process flow. In one example, the user may initiate the interaction at Point of Sale terminal using the resource distribution device. In another example, the user may initiate the interaction at an Automated Teller Machine using the resource distribution device. In another example, the user may initiate the interaction on an online server using the resource distribution device. In some embodiments, the system identifies initiation of the interaction based on receiving an indication from the resource distribution device. For example, the one or more logical components in the resource distribution device notify the system when the user initiates a transaction. In some embodiments, the system identifies initiation of the interaction based on receiving an indication from the entity device (e.g., Point of Sale terminal, Automated Teller Machine, online server, or the like), where the interaction is initiated at the entity device by the user. In some embodiments, immediately upon detecting initiation of the interaction, the system may perform a part of the process flow described in FIG. 5B (e.g., step 560).

As shown in block 510, the system receives a request to verify a digital resource from an entity device, wherein the digital resource is captured by the entity device from a display of the resource distribution device. In one example, the user may scan the resource instrument at the entity device to initiate the interaction. In such cases, the user may scan a digital resource being displayed on the resource distribution device using a scanner of the entity device. In another example, the resource instrument may connect with the entity device, via Near Field Communication interface, via one or more logical components of the resource instrument. In such cases, the entity device may communicate with the one or more logical components of the resource instrument to retrieve a digital resource being displayed on the resource instrument. Upon receiving/retrieving the digital resource from the resource distribution device, the entity device transmits the digital resource to the system of this invention for verification, which may serve as a first layer of authentication. As shown in block 515, the system verifies that the digital resource matches a stored digital resource linked with the user and transmits a confirmation to the entity device.

As shown in block 520, the system receives a completion request from an interaction server to complete the interaction. Upon receiving the confirmation from the system, the entity device transmits information associated with the interaction to the interaction server. For example, if the entity device is a POS terminal at a merchant location, the POS terminal transmits the transaction data to a transaction server associated with a financial institution of the merchant. Upon receiving the transaction information, the transaction server, transmits a request to the system to complete the transaction by transferring the resources associated with the transaction from an account of the user linked with the resource distribution device.

As shown in block 525, the system validates that the digital resource is registered to the user. In some embodiments, the system, upon receiving the request, may perform validation by communicating with an entity system. In some embodiments, the system, upon receiving the request, may perform validation by communicating with the distributed register, where the digital resources are created and stored. As shown in block 530, the system determines that the validation is successful.

As shown in block 535, the system performs multi-level authentication to authorize completion of the interaction. In some embodiments, the multi-level authentication may include generating and transmitting a one time password to a registered contact information associated with the user. In some embodiments, the multi-level authentication may include prompting the user to provide a fingerprint, via a fingerprint scanner located on the resource distribution device, receiving the fingerprint from the user, via the fingerprint scanner, verifying that the fingerprint received via the fingerprint scanner matches a stored fingerprint, and authorize the interaction based on verifying that the fingerprint received via the fingerprint scanner matches the stored fingerprint. In some embodiments, prompting the user may be performed via the entity device. In some embodiments, the entity device may comprise an application provided by the system of the present invention, where the system may transmit one or more control signals to the entity device via the application to cause the entity device to perform one or more actions. In some embodiments, the stored fingerprint may be stored in the entity system. In some embodiments, the stored fingerprint may be stored in a memory of the resource distribution device. In some embodiments, the system may use any combination of the available authentication methods along with the fingerprint authentication to perform the multi-level authentication.

As shown in block 538, the system completes the interaction in response to performing the multi-level authentication. Continuing with the previous example, completion of the interaction may comprise transfer of resources from the account of the user associated with the resource distribution device to a financial institution associated with the merchant.

Figure 5B:
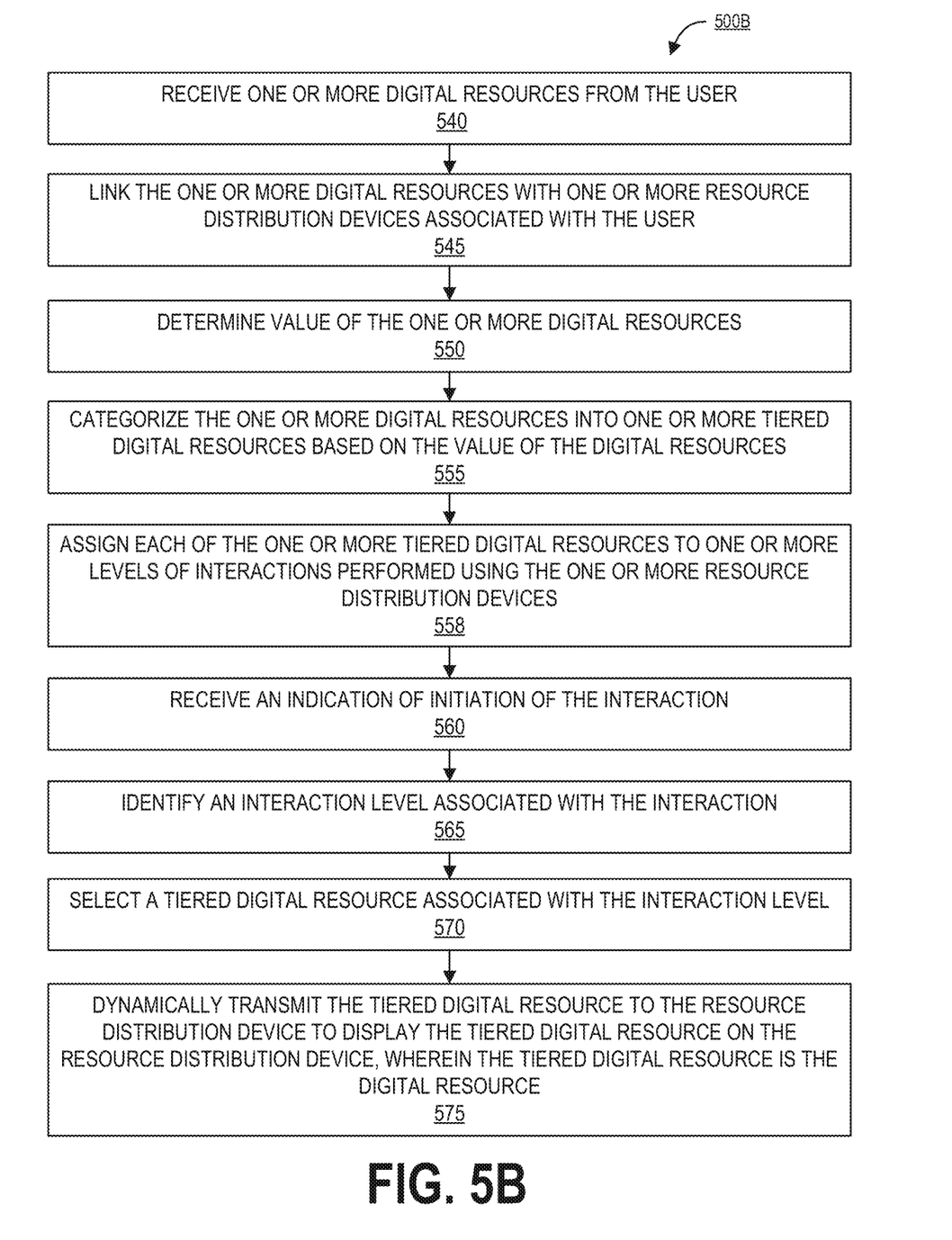
FIG. 5B provides a process flow for categorizing one or more digital resources to tiered digital resources and dynamically assigning the tiered digital resources to resource distribution devices, in accordance with an embodiment of the invention.
Figure 6:
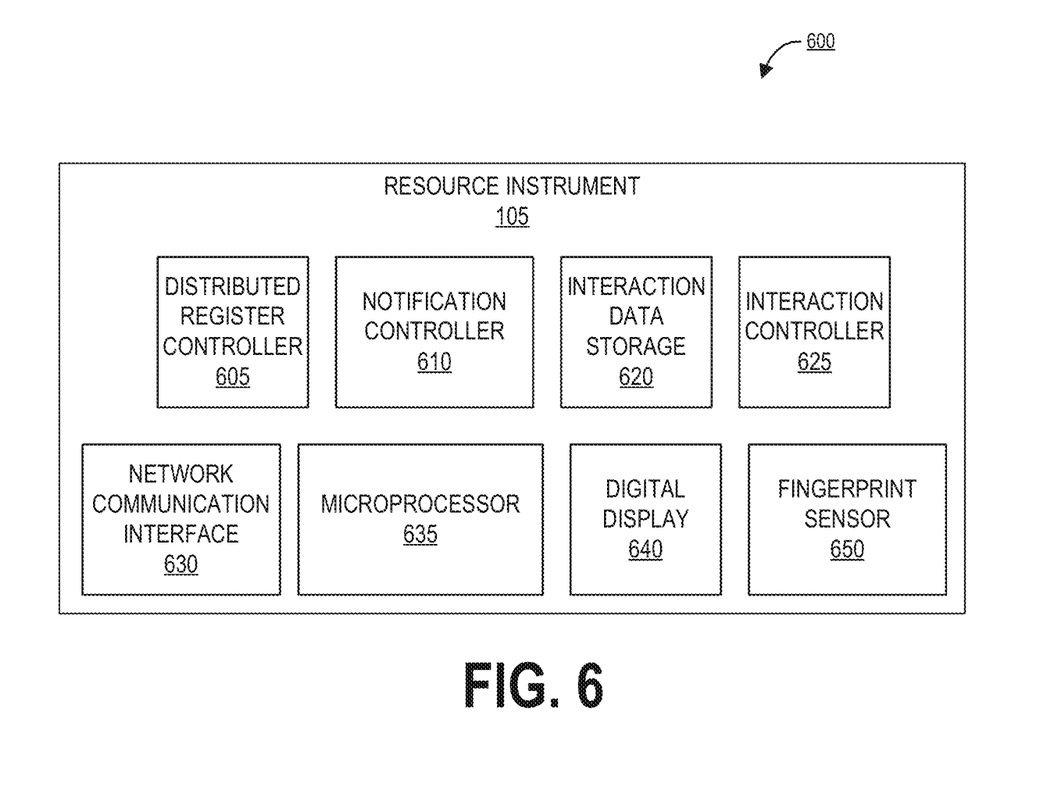
FIG. 6 provides a block diagram illustrating one or more logical components of a resource instrument, in accordance with an embodiment of the invention.

FIG. 5B provides a block diagram illustrating a process flow 500B for categorizing one or more digital resources to tiered digital resources and dynamically assigning the tiered digital resources to resource distribution devices, in accordance with an embodiment of the invention.

As shown in block 540, the system receives one or more digital resources from the user. The one or more digital resources may be any digital resources that are created or received by the user, where the one or more digital resources are stored on a distributed register. The system allows the user to link the one or more digital resources to one or more resource distribution devices, via a user interface provided by the system. As shown in block 545, the system links the one or more digital resources with one or more resource distribution devices associated with the user based on selection received from the user via the user interface. For example, the user may choose to link all the digital resources with all resources distribution devices of the user.

As shown in block 550, the system determines value of the one or more digital resources. Upon linking the one or more digital resources with the one or more resource distribution devices, the system determines the value of the one or more digital resources by communicating with the distributed register and/or one or more third party systems.

As shown in block 555, the system categorizes the one or more digital resources into one or more tiered digital resources based on the value of the digital resources. Categorization may comprise categorizing the one or more digital resources into different tiers such as high value resources, medium value resources, low value resources, or the like based on the value of the one or more digital resources.

As shown in block 558, the system assigns each of the one or more tiered digital resources to one or more levels of interactions performed using the one or more resource distribution devices. The one or more levels of interactions may be associated with the interaction amount associated with the interactions. For example, an interaction above first limit may be considered a medium level interaction and the system may assign medium value digital resources to medium level interactions, where the medium value digital resources may be used to authenticate medium level interactions.

As shown in block 560, the system receives an indication of initiation of the interaction as explained in block 505. As shown in block 565, the system identifies an interaction level associated with the interaction. The system categorizes the interaction as a high level, medium level, or low level interaction based on the interaction amount associated with the interaction.

As shown in block 570, the system selects a tiered digital resource associated with the interaction level. The system selects a tiered digital resource from a tier that is assigned to the corresponding interaction level associated with the interaction. For example, the system determines that the interaction is a high level transaction and may select a high value digital resource for the interaction. As shown in block 575, the system dynamically transmits the tiered digital resource to the resource distribution device to display the tiered digital resource on the resource distribution device. The tiered digital resource is the digital resource received from the entity device is step 510 of FIG. 5A. The system communicates with one or more logical components of the resource distribution device to display the digital resource. In some embodiments, the system may transmit control signals to the resource distribution device, via an application present in the memory of the resource distribution device, where the application is provided by the system of the present invention. The system dynamically selects and displays digital resources on the resource distribution device, which decreases the number of unauthorized interactions and increases the efficiency of performing interactions securely.

FIG. 6 provides a block diagram 600 illustrating one or more logical components of a resource instrument, in accordance with an embodiment of the invention. As shown, the resource instrument 105 comprises a distributed register controller 605, a notification controller 610, an interaction data storage 620, an interaction controller 625, a network communication interface 630, a microprocessor 635, a digital display 640, and a fingerprint sensor 650. The distributed register controller 605 allows the resource instrument to communicate directly with the distributed register. The notification controller 610 initiates notifications to transmit to the user the resource instrument is linked to via the network communication interface 630. The network communication interface 630 is responsible for transmitting and receiving all network communications associated with the resource instrument 105. The interaction controller 625 allows an interaction to be completed via the resource instrument 105 at any of the entity devices. The interaction data storage 620 one or more fingerprints associated with the user. The microprocessor 635 interacts with other logical components and provides the processing capability to implement/process one or more actions. The digital display 640 may display digital resources (Non-Fungible Tokens) linked with the resource instrument 105. As explained above, the digital resources may be transmitted by the system of the invention to the resource instrument 105 dynamically after initiation of an interaction. The fingerprint sensor 650 allows the system to authenticate the user who initiated the interaction. In some embodiments, the one or more logical components are controlled by the system of the invention to perform one or more steps of the process flow 500.

Figure 7:
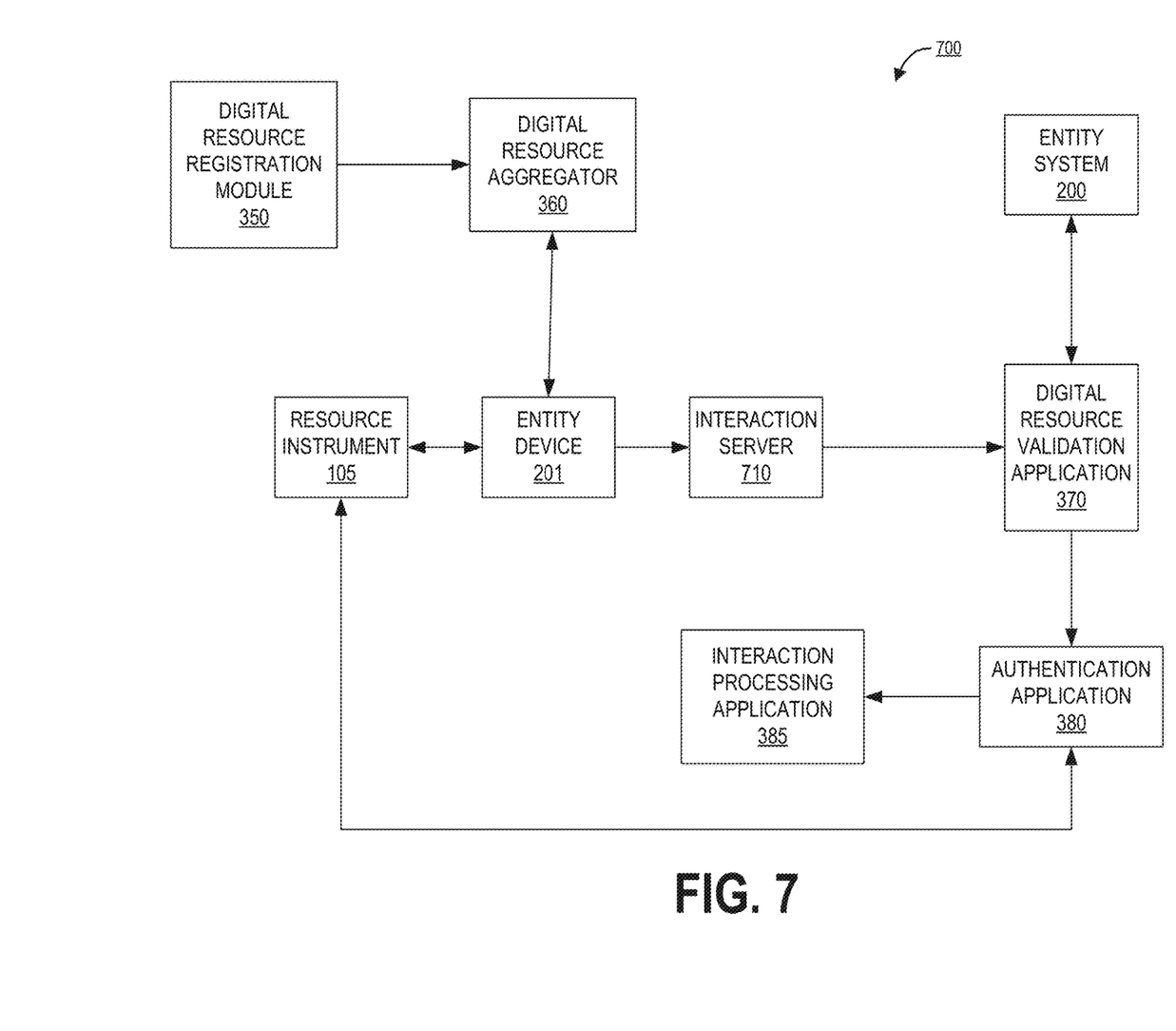
FIG. 7 provides a block diagram illustrating the process flow for authenticating interactions with dynamically varying digital resources linked to resource distribution devices, in accordance with an embodiment of the invention.

FIG. 7 provides a block diagram 700 illustrating the process flow for authenticating interactions with dynamically varying digital resources linked to resource distribution devices, in accordance with an embodiment of the invention. As shown, the system allows the users to register one or more digital resources, via the digital resource registration module 350, where the digital resource registration module 350 receives the one or more digital resources from the user. Upon registration, the one or more digital resources are linked to the one or more resource distribution devices by the digital resource aggregator 360 of the system. The digital resource aggregator 360 also categorizes, stores, and manages the one or more digital resources of the user. After registering the one or more digital resources, the user may initiate an interaction at an entity device 201, via a resource instrument 105. Upon initiation of the interaction, the entity device 201 and/or the resource instrument 105 may notify the system. After receiving the indication of the initiation of the interaction, the digital resource aggregator 360 selects digital resource matching a level of the interaction and transmits the digital resource back to the resource instrument 105. The resource instrument 105 displays the digital resource received from the digital resource aggregator 360, via the digital display 640. The entity device 201 may communicate with the resource instrument 105 to retrieve the digital resource that is being displayed or the user may scan the digital resource via a scanner of the entity device 201. After receiving/retrieving the digital resource, the entity device 201 may transmit the digital resource back to the digital resource aggregator 360 for verification. The digital resource aggregator 360 verifies that the digital resource matches the digital resource that was transmitted and transmit a confirmation back to the entity device 201. The entity device 201 transmits information associated with the interaction to an interaction server 710, where the interaction server 710 raises a request to complete the interaction. In some cases, this request may be received by the entity system 200 that manages an account of the user that is linked with the resource distribution device and the entity system 200 completes the interaction. In some embodiments, since the system of the present invention may be a part of the entity system 200, the request is received by the digital resource validation application 370. The digital resource validation application 370 communicates with the entity system 200 and/or the distributed register to validate that the digital resource is registered/associated with the user. Upon successful validation, the authentication application 380 performs multi-level authentication which may at least include communicating with the resource instrument 105 to perform fingerprint authentication, via the fingerprint sensor 650. Once the multi-level authentication performed by the authentication application 380 is successful, the interaction processing application 385 completes the interaction.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating interactions with dynamically varying digital resources linked to resource distribution devices, the system comprising:
    a memory device with computer-readable program code stored thereon;
    a communication device; and
    a processing device operatively coupled to the memory device and the communication device, wherein the processing device is configured to execute the computer-readable program code to:
        identify initiation of an interaction by a user, via a resource distribution device;
        identify an interaction level associated with the interaction;
        select a tiered digital resource from one or more tiered digital resources associated with the interaction level of the interaction, wherein the one or more tiered digital resources are associated with the user;
        dynamically transmit the tiered digital resource to the resource distribution device to display the tiered digital resource on the resource distribution device;
        receive a request to verify the tiered digital resource from an entity device, wherein the tiered digital resource is captured by the entity device from a display of the resource distribution device;
        verify that the tiered digital resource matches a stored digital resource linked with the user and transmit a confirmation to the entity device;
        receive a completion request from an interaction server to complete the interaction;
        validate that the tiered digital resource is registered to the user;
        determine that the validation is successful;
        perform multi-level authentication to authorize completion of the interaction; and
        complete the interaction in response to performing the multi-level authentication.

2. The system according to claim 1, wherein the processing device is further configured to execute the computer-readable program code to identify the initiation of the interaction based on receiving an indication from the resource distribution device.

3. The system according to claim 1, wherein the processing device is further configured to execute the computer-readable program code to identify the initiation of the interaction based on receiving an indication from the entity device, wherein the interaction is initiated at the entity device by the user.

4. The system according to claim 1, wherein the processing device is further configured to execute the computer-readable program code to:
    receive one or more digital resources from the user;
    link the one or more digital resources with one or more resource distribution devices associated with the user, wherein the one or more resource distribution devices comprise the resource distribution device and the one or more or digital resources comprise the digital resource;
    determine value of the one or more digital resources;
    categorize the one or more digital resources into the one or more tiered digital resources based on the value of the digital resources; and
    assign each of the one or more tiered digital resources to one or more levels of interactions performed using the one or more resource distribution devices.

5. The system according to claim 1, wherein the processing device is further configured to execute the computer-readable program code to perform the multi-level authentication based on:
    prompting the user to provide a fingerprint, via a fingerprint scanner located on the resource distribution device;
    receiving the fingerprint from the user, via the fingerprint scanner;
    verifying that the fingerprint received via the fingerprint scanner matches a stored fingerprint; and
    authorizing the interaction based on verifying that the fingerprint received via the fingerprint scanner matches the stored fingerprint.

6. The system according to claim 5, wherein the stored fingerprint is stored in the entity system or a memory of the resource distribution device.

7. A computer program product for authenticating interactions with dynamically varying digital resources linked to resource distribution devices, the computer program product comprising at least one non-transitory computer readable medium having computer-readable program code portions embodied therein, the computer-readable program code portions comprising executable portions for:
    identifying initiation of an interaction by a user, via a resource distribution device;
    identifying an interaction level associated with the interaction;
    selecting a tiered digital resource from one or more tiered digital resources associated with the interaction level of the interaction, wherein the one or more tiered digital resources are associated with the user;
    dynamically transmitting the tiered digital resource to the resource distribution device to display the tiered digital resource on the resource distribution device;
    receiving a request to verify the tiered digital resource from an entity device, wherein the tiered digital resource is captured by the entity device from a display of the resource distribution device;
    verifying that the tiered digital resource matches a stored digital resource linked with the user and transmit a confirmation to the entity device;
    receiving a completion request from an interaction server to complete the interaction;
    validating that the tiered digital resource is registered to the user;
    determining that the validation is successful;
    performing multi-level authentication to authorize completion of the interaction; and
    completing the interaction in response to performing the multi-level authentication.

8. The computer program product of claim 7, wherein the computer-readable program code portions comprising executable portions for identifying the initiation of the interaction based on receiving an indication from the resource distribution device.

9. The computer program product of claim 7, wherein the computer-readable program code portions comprising executable portions for identifying the initiation of the interaction based on receiving an indication from the entity device, wherein the interaction is initiated at the entity device by the user.

10. The computer program product of claim 7, wherein the computer-readable program code portions comprising executable portions for:
receiving one or more digital resources from the user;
linking the one or more digital resources with one or more resource distribution devices associated with the user, wherein the one or more resource distribution devices comprise the resource distribution device and the one or more or digital resources comprise the digital resource;
determining value of the one or more digital resources;
categorizing the one or more digital resources into the one or more tiered digital resources based on the value of the digital resources; and
assigning each of the one or more tiered digital resources to one or more levels of interactions performed using the one or more resource distribution devices.

11. The computer program product of claim 7, wherein the computer-readable program code portions comprising executable portions for performing the multi-level authentication based on:
prompting the user to provide a fingerprint, via a fingerprint scanner located on the resource distribution device;
receiving the fingerprint from the user, via the fingerprint scanner;
verifying that the fingerprint received via the fingerprint scanner matches a stored fingerprint; and
authorizing the interaction based on verifying that the fingerprint received via the fingerprint scanner matches the stored fingerprint.

12. A computer-implemented method for authenticating interactions with dynamically varying digital resources linked to resource distribution devices, the method comprising:
identifying initiation of an interaction by a user, via a resource distribution device;
identifying an interaction level associated with the interaction;
selecting a tiered digital resource from one or more tiered digital resources associated with the interaction level of the interaction, wherein the one or more tiered digital resources are associated with the user;
dynamically transmitting the tiered digital resource to the resource distribution device to display the tiered digital resource on the resource distribution device;
receiving a request to verify the tiered digital resource from an entity device, wherein the tiered digital resource is captured by the entity device from a display of the resource distribution device;
verifying that the tiered digital resource matches a stored digital resource linked with the user and transmit a confirmation to the entity device;
receiving a completion request from an interaction server to complete the interaction;
validating that the tiered digital resource is registered to the user;
determining that the validation is successful;
performing multi-level authentication to authorize completion of the interaction; and
completing the interaction in response to performing the multi-level authentication.

13. The computer-implemented method of claim 12, wherein the method comprises identifying the initiation of the interaction based on receiving an indication from the resource distribution device.

14. The computer-implemented method of claim 12, wherein the method comprises identifying the initiation of the interaction based on receiving an indication from the entity device, wherein the interaction is initiated at the entity device by the user.

15. The computer-implemented method of claim 12, wherein the method comprises:
receiving one or more digital resources from the user;
linking the one or more digital resources with one or more resource distribution devices associated with the user, wherein the one or more resource distribution devices comprise the resource distribution device and the one or more or digital resources comprise the digital resource;
determining value of the one or more digital resources;
categorizing the one or more digital resources into the one or more tiered digital resources based on the value of the digital resources; and
assigning each of the one or more tiered digital resources to one or more levels of interactions performed using the one or more resource distribution devices.

16. The computer-implemented method of claim 12, wherein the method comprises performing the multi-level authentication based on:
prompting the user to provide a fingerprint, via a fingerprint scanner located on the resource distribution device;
receiving the fingerprint from the user, via the fingerprint scanner;
verifying that the fingerprint received via the fingerprint scanner matches a stored fingerprint; and
authorizing the interaction based on verifying that the fingerprint received via the fingerprint scanner matches the stored fingerprint.

17. The computer-implemented method of claim 16, wherein the stored fingerprint is stored in the entity system or a memory of the resource distribution device.

18. The system according to claim 4, wherein the one or more digital resources are Non-Fungible Tokens (NFTs).

19. The computer program product of claim 10, wherein the one or more digital resources are Non-Fungible Tokens (NFTs).

20. The computer-implemented method of claim 15, wherein the one or more digital resources are Non-Fungible Tokens (NFTs).

* * * * *